US008150652B2

(12) United States Patent
Rager et al.

(10) Patent No.: US 8,150,652 B2

(45) Date of Patent: Apr. 3, 2012

(54) METHOD AND SYSTEM FOR AUTOMATIC WEDGE IDENTIFICATION FOR AN ULTRASONIC INSPECTION SYSTEM

(75) Inventors: Kirk M. Rager, Reedsville, PA (US); Jason Habermehl, Stoneham (CA); Fabrice Cancre, Lexington, MA (US)

(73) Assignee: Olympus NDT, Waltham, MA (US)

( * ) Notice: Subject to any disclaimer, the term of this patent is extended or adjusted under 35 U.S.C. 154(b) by 385 days.

(21) Appl. No.: 12/412,960

(22) Filed: Mar. 27, 2009

(65) Prior Publication Data

US 2010/0250151 A1 Sep. 30, 2010

(51) Int. Cl.
*G01B 5/02* (2006.01)
*G01N 29/04* (2006.01)

(52) U.S. Cl. .......................................... 702/159; 73/624

(58) Field of Classification Search .................... 702/39, 702/159; 73/598, 624
See application file for complete search history.

(56) References Cited

U.S. PATENT DOCUMENTS 7,823,451 B2 * 11/2010 Sarr ................................ 73/598
2010/0046576 A1 * 2/2010 Desai ............................ 374/119

* cited by examiner

*Primary Examiner* — Bryan Bui

(74) *Attorney, Agent, or Firm* — Ostrolenk Faber LLP

(57) ABSTRACT

Disclosed is a method and system which efficiently and accurately identifies an acoustic wedge by as simple as pressing a button to execute a command for a phased array inspection system, once the wedge is engaged with the system. It is based on the approach to use the time of flight that ultrasonic signals travel in the wedge to measure and calculate critical parameters, such as the wedge acoustic velocity, the wedge or incident angle and the height of the first element of the associated phased array probe above the base of the wedge.

28 Claims, 10 Drawing Sheets

METHOD AND SYSTEM FOR AUTOMATIC WEDGE IDENTIFICATION FOR AN ULTRASONIC INSPECTION SYSTEM

FIELD OF THE DISCLOSURE

The present disclosure generally relates to a method and a system for identifying wedges used in phased array ultrasonic systems and, more particularly, for automatically identifying probe wedges and wedge working conditions used in phased array ultrasonic systems.

BACKGROUND OF THE DISCLOSURE

Ultrasonic phased array instruments provide a significant advantage for many applications because they display a cross section of the region being inspected, thereby faciltating the visualization of a defect, its feature, location and size, typically sought by ultrasonic inspection. Another significant advantage of ultrasonic phased array instruments is that they provide much higher productivity in comparison to single-element probe systems.

A typical ultrasonic phased array instrument uses a probe comprised of an array of small sensor elements, each of which can be pulsed individually in accordance with focal laws, to steer and focus excitation signals, and received signals.

For industrial phased array and single element ultrasonic NDT/NDI applications, wedges are used to refract (Snell's Law) the ultrasonic wave from an ultrasonic transducer (probe element) into the material under test. When creating a two dimensional image or individual A-scans, parameters such as wedge or incident angle, wedge velocity, and height of the first element must be known. These wedge parameters are used to delay A-scans to compensate electronically for the time the acoustic wave travels in the wedge. This compensation provides for more readily interpreted A-scans. Along with the test object material properties, these wedge parameters are also used to determine the refracted angle of the acoustic wave in the test object material as calculated using Snell's Law.

In existing practice, the basic wedge parameters are manually provided to ultrasonic NDT/NDI instruments. This information is usually provided by the wedge manufacturer in the form of a specification sheet or an engraving on the wedge. Additionally, modern ultrasonic acquisition devices of NDT/NDI typically have a database of wedges from which the wedges can be chosen. The wedge part number, which is often engraved on the wedges, is typically required in order to choose an appropriate wedge data from the database.

Manually providing input regarding wedge parameters into an ultrasonic NDT/NDI system is prone to error for many reasons. For new wedges, variation in fabrication tolerances can, to some degree, cause variation in mechanical parameters. Acoustic velocity also varies between different batches of wedge material. Also, wedge specification sheets are often lost or missing. In addition, there can be more information associated with a given wedge than can be engraved on a small wedge, and the engravings can fade with wedge usage. Also worth noting is that, with usage, wedges can become worn thereby the angle of a wedge and height of the first element can be changed. Also the parameters are typically reported as designed and not as manufactured. The method does not account for manufacturing tolerances in the wedge, the probe and the mounting of the probe onto the wedge, all of which lead to inspection errors. In addition, when giving recommended wedge parameters, manufacturers do not take into consideration the variations in wedge working temperature which can affect the velocity of sound in the wedge and therefore the refraction angle produced in the material under inspection is not as accurate.

It is commonly recognized that existing wedge identification methods not only are cumbersome and costly, but also lack accuracy which may be significant when critical information is missed during an ultrasonic inspection.

The present disclosure aims to automatically detect wedges for ultrasonic NDT/NDI devices and describes methods and systems to achieve that objective. Some examples are to store wedge identification information in the form of RFID, coded electronics, printed bar coded and EPROM, which are affixed inside or on the surfaces of the wedges. While these potential methods could deliver the basic wedge information to the instrument, they do not account for the factors caused by wedge wear, variations in the velocity due to temperature changes and variations in material due to manufacturing process. As a result, the accuracy of the information is compromised. Furthermore, these methods need extra material and operational steps to implement and therefore are not economical.

On the other hand, it is an existing practice in many applications that after the probe and wedge parameters are provided to the instrument, time-of-flight wedge calibrations are performed. Time-of-flight calibration of wedges is used to fine tune the acoustic time-of-flight within the wedge which may vary somewhat with respect to the manufacturer recommended parameters provided for each wedge and also with respect to wear. However, this practice does not solve the issue of identifying the wedge at the beginning of each phased array operation and the calibration can only be done periodically. In addition, wedges still need to be identified before any calibration process.

There is therefore a long felt, but unmet, need to provide an easier to use, less costly and more versatile approach to enable automatic wedge identification for ultrasonic phased array systems.

SUMMARY OF THE DISCLOSURE

The invention disclosed herein solves outstanding problems related to phased array ultrasonic systems where the existing wedge identification for the phased array instruments is cumbersome, inaccurate and costly.

The method and system of the present disclosure is based on a simple approach to use time of flight that ultrasonic signals travel in a wedge to measure and calculate critical parameters, such as the wedge acoustic velocity, the wedge or incident angle and the height of the first element of the associated phased array probe.

Accordingly, it is a general object of the present disclosure to provide a method and system for automatically identifying wedges of an ultrasonic phased array system by measuring time-of-flight across a few predetermined dimensions within the wedges. This allows phased array operation bypassing the requirement for the operator to manually choose the wedge from a list and manually provide the wedge parameters to the instrument. The operator will no longer need to know any of the critical parameters of the wedge. This is especially important when minimally trained users are changing wedges regularly. It can be appreciated by those skilled in the art that this will significantly increase productivity and decrease human error and the level of training.

It can be understood that with the presently disclosed system employed, it would be beneficial for wedges to still have an engraving or marking so the operator can easily identify the most basic information on the wedge being used. However, once the wedge is attached to the probe, the wedge identification, including making input of all the wedge parameter to the phased array system is a simple matter of plug-and-play.

It is further an object of the present disclosure to provide a method and system eliminating any confusion or chance for error and further determining the actual working conditions of the wedges, including wedge material velocity and incident angle which can vary due to machining tolerances, material property changes, wear from usage and temperature change.

Useful wear limits can be provided to the instrument leading to the potential for automated indications when a wedge has exceeded its wear limit. Even for worn wedges, the instrument can adjust to create the corrected image based on the actual parameters rather than the designed parameters. This possibility leads to an extended lifetime on typical wedges as more significant wedge wear can be tolerated without affecting the inspection results.

It is further an object of the present disclosure to provide a method and system that allows for validating wedge parameters provided by any of the background art approaches. The parameters of the actual wedge on a phased array probe being used can be compared to the wedge parameters chosen from a user selectable wedge list or manually provided by the user. This is particularity useful for wedges that allow for multiple probe positions and wedges with engravings that may have worn off to certain degree.

It is further an object of the present disclosure to provide a method and system that allows the usage of non-standard wedges that are not listed in the manufacturer provided wedge-list. Any wedge type from any manufacturer with any material can be automatically identified as long as the wedge is used with a flat phased array probe, the wedge contact surface is substantially flat and the wedge material is substantially homogeneous.

It can be further appreciated by those skilled in the art that this could also lead to significant decrease on the size of the wedge list.

It is further an object of the present disclosure to provide a method and system to achieve automatic wedge identification that can be implemented by easily adding computing programs to one or more existing micro-processors without the need of adding any hardware to existing phased array systems.

The foregoing and other objects, advantages and features of the present invention will become more apparent upon reading of the following non restrictive description of illustrative embodiments, given for the purpose of illustration only with reference to the enclosed drawings.

DETAILED DESCRIPTION OF PREFERRED EMBODIMENTS OF THE PRESENT DISCLOSURE

Figure 1:
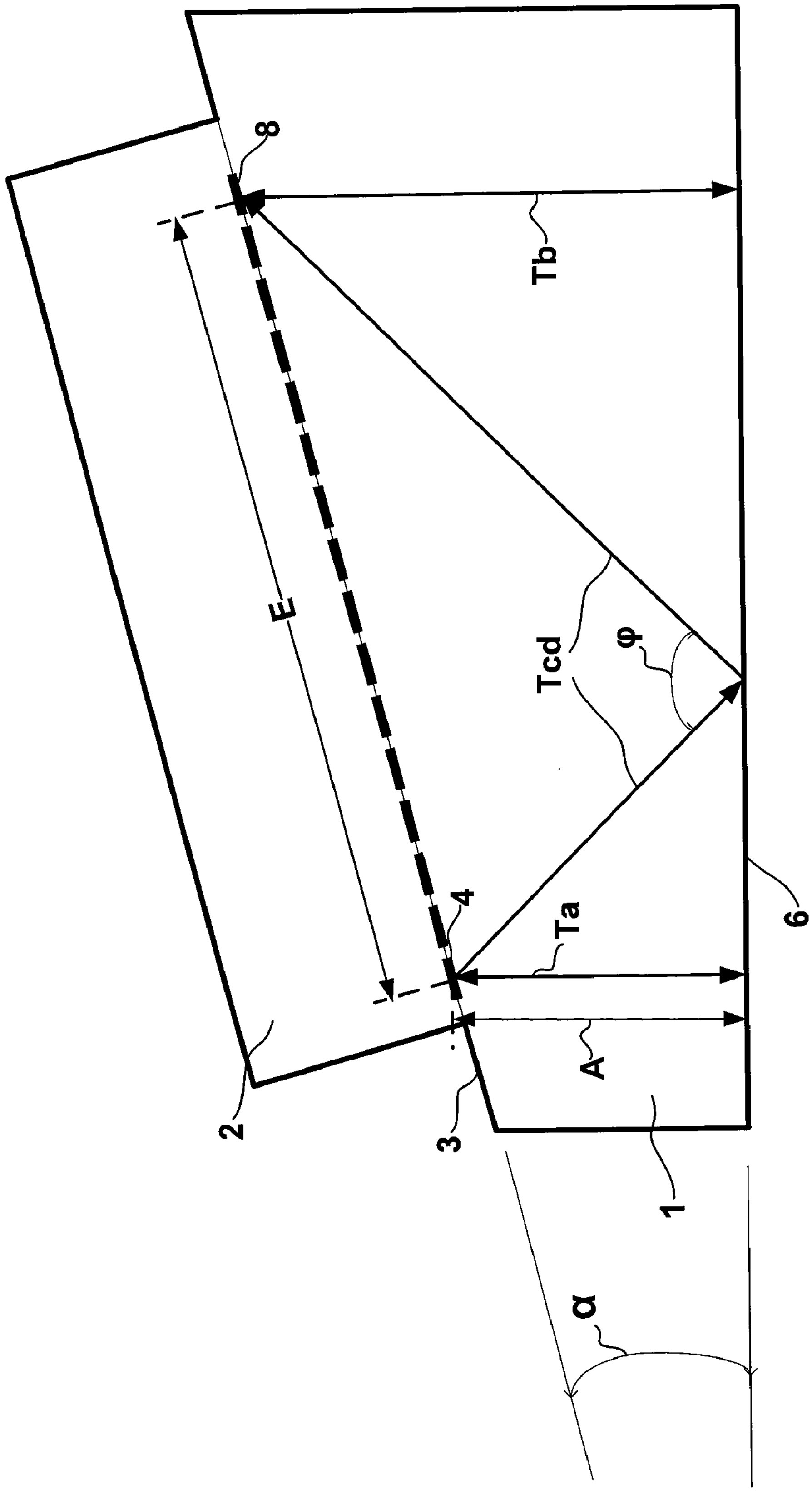
FIG. 1 is a cross-section view of a typical phased array probe and an angle beam wedge showing the time-of-flight measurements used to calculate wedge parameters.

Referring to FIG. 1, an angle wedge 1 is attached to a 16-element phased array probe 2 using a conventional attaching means of a mechanical fastener and ultrasonic coupling means. Probe 2 is connected to an otherwise conventional ultrasonic phased array instrument, which provides the functions of applying focal laws and subsequent A-Scans and other related typical ultrasonic data analysis. Reference numerals 4 and 8 denote the first and last probe element from left to right, respectively. Surface 3 denotes the top wedge surface and also the surface between wedge 1 and the phase array probe 2. Surface 6 denotes the inner bottom surface of the wedge 1. Angle α denotes the wedge angle of wedge 1.

During the operation of presently disclosed auto wedge identification, wedge 1 is preferably removed from test material or target and the bottom of wedge 1 only abuts to ambient air. In addition, the bottom of wedge 1 should be dry and clean and free of coupling gel. The wedge could also abut the material under test but it should be noted that because of the nonuniformity and thickness of the coupling gel, this method would add a variable that could lead to inaccuracies.

Referring to FIG. 1, to illustrate the presently disclosed method and system of wedge identification, element 4 in probe 2 is pulsed with ultrasonic signal. The ultrasonic phased array instrument to which probe 2 is attached measures time-of-flight, hereinafter TOF, Ta. Ta is the time it takes for the front of a sound wave emitted from first element 4, traveling to and reflected from surface 6 and returning back to element 4. The ultrasonic phased array instrument similarly measures time Tb, which is the time it takes for the front of a sound wave emitted from last element 8 traveling to and reflected from surface 6 and returning back to element 8.

Subsequently, the instrument sends a pulse from the first element 4 and measures TOF Tcd. Tcd refers to the time it takes for a sound wave emitted from first element 4 to travel to last element 8 after reflecting from opposite surface 6 of wedge 1. The angle between the two segments of Tcd is herein referred to as $<\phi$.

It can be appreciated by those skilled in the art that although the preferred embodiment presented herein uses first element 4 and last element 8, other combinations of coupling elements can be used and the use of which remains within the scope of the present disclosure.

It can be understood that wedge 1 is preferably clean and dry during these measurements.

As a common practice, wedge parameters that are sought as input to ultrasonic phased array instruments are:

<α, commonly called as 'wedge angle or incident angle', is defined as the angle between wedge surface 3 and wedge surface 6;

V, is defined as the acoustic velocity of the material of wedge 1;

A, is defined as the height of the first element and refers to the distance between the center of first element 4 and wedge surface 6 at a right angle to wedge surface 6. It should be noted that this is different from Ta, which is the TOF for acoustic wave travel from element 4 to surface 6, and then return back to element 4.

Above listed wedge parameters α, V and A are calculated from TOFs Ta, Tb , Tcd and distance, E, herein defined as the distance from the center of the first element 4 to the center of last element 8 of probe 2. Distance E, a property of probe 2, is normally provided to the instrument either manually by an operator or automatically, as automatic phased array probe identification is widely used in the market. The variables α, V and A of wedge 1 are calculated as follows.

The calculations presented here are based on relatively simple geometric and trigonometric theory such as theorems of Pythagora and Al-Kashi. There are multiple methods for solving the parameters α, V and A from the measured TOFs, Ta, Tb and Tcd and probe parameter E. A simple formulation is presented here where each of calculated wedge parameters is presented as a function of Ta, Tb, Tcd and E.

$$\alpha = \sin^{-1}\left(\frac{(Tb - Ta)}{2 * \sqrt{Tcd^2 - Ta * Tb}}\right) \quad \text{Eq. 1}$$

$$V = \frac{E}{\sqrt{Tcd^2 - Ta * Tb}} \quad \text{Eq. 2}$$

$$A = \frac{Ta * E}{2 * \sqrt{Tcd^2 - Ta * Tb}} \quad \text{Eq. 3}$$

The above mentioned equations describe a preferred method for calculating parameters α, V and A from the measured time-of-flight values Ta, Tb, Tcd and the probe specific parameter E. It can be appreciated by the ordinary skill in the art that alternative methods and resulting equations can be derived from the preferred method described herein for the same law of physics.

Tests using the automatic wedge detection method described herein have shown that providing the automatically measured wedge parameters to a phased array instrument may negate the need to recalibrate for time-of-flight after the wedge has been identified. This is because the automatic wedge detection provides results that are substantially equivalent to those of being provided following time-of-flight calibration. If time-of-flight wedge calibration is required, automatic wedge detection provides a very close approximation from which to further calibrate and therefore greatly simplifies the process of recalibration. Additionally, presently disclosed automatic wedge identification provides parameters α, V and A which are specific to the wedge and have an effect on the generation of focal laws by the phased array instrument thereby providing for potentially more accurate focal laws.

Figures 2A, 2B, 2C:
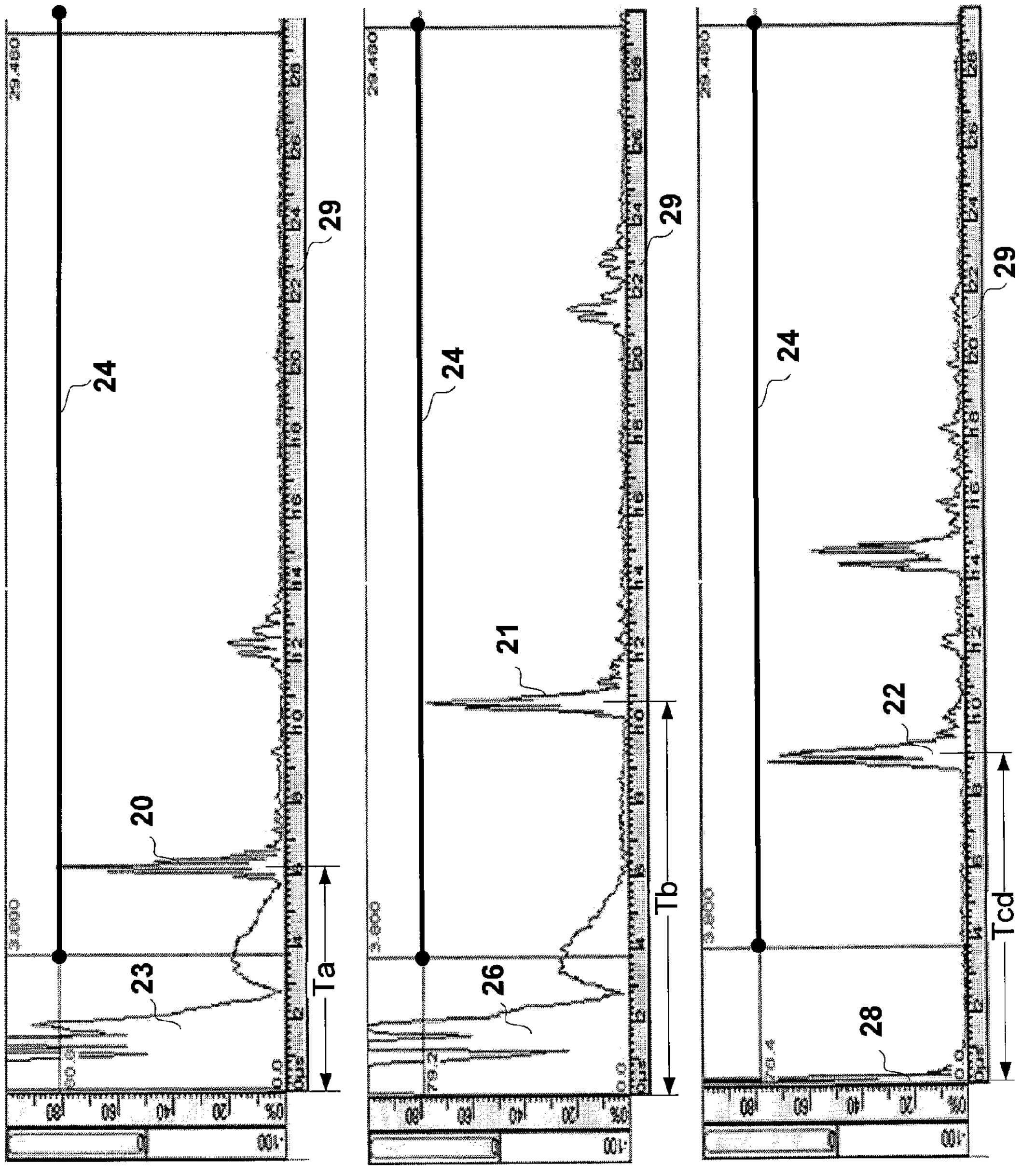
FIG. 2*a* is an A-scan display image for a probe on an angle beam wedge showing the TOF of 6 μs as Ta.
FIG. 2*b* is an A-scan display image for a probe on an angle beam wedge showing the TOF of 10.8 μs as Tb.
FIG. 2*c* is an A-Scan display image for a probe on an angle beam wedge showing the TOF of 8.9 μs as Tcd.

FIGS. 2*a*, 2*b* and 2*c* show a few representative A-scans of the echo signals when different focal laws are applied providing Ta, Tb and Tcd for a 5 MHz probe on a relatively small wedge. More specifically, the focal law for measuring Ta entails emitting and receiving acoustic energy from and at first element 4. The focal law for measuring Tb entails emitting and receiving acoustic energy from and at last element 8. The focal law for measuring Tcd entails emitting acoustic energy from first element 4 and receiving said energy at last element 8.

Referring to the A-scan shown in FIG. 2*a*, echo 20 is propagated from the main bang echo 23. Echo 20 originates from the acoustic energy emitted from first element 4, reflected from wedge surface 6 and received back at element 4. Therefore the TOF of echo 20, measured by time scaled 29 from when the focal law is fired to when the peak of echo 20 presents, provides Ta. The point of measuring of the signal can be any of several points, including the signal mid point or the crossing point and the like.

Referring to the A-scan shown in FIG. 2*b*, echo 21 is propagated from the main bang echo 26. Echo 21 originates from the acoustic energy emitted from last element 8, reflected from wedge surface 6 and received back at element 8. Therefore the TOF of echo 21, measured by time scaled 29 from when the focal law is fired to when the peak of echo 20 presents, provides Tb.

Referring to FIG. 2*c*, the A-scan demonstrates echo 22 propagated from the main bang echo 28. Echo 22 originates from the acoustic energy emitted from first element 4, reflected from wedge surface 6 and received back at element 8. Therefore the TOF of echo 22, measured by time scaled 29 from when the focal law is fired to when the peak of echo 22 presents, provides Tcd.

It should be noted that in this preferred embodiment of the presently disclosed auto wedge identification method, the wedge identification process is preferably to be conducted as a pre-test application when no coupling gel or testing target is placed against the bottom surface of the wedge. This can increase the accuracy when the peak of the echoes 20, 21 and 22 occurs. It can be appreciated by those skilled in the art that programs can also be developed to recognize the echo reflected from surface 6 and distinguish it from those reflected from the testing target when the auto wedge identification process is performed during a normal test cycle.

An automated process involving automated gain adjustment and fixed or variable position gates can be applied to automatically measure Ta, Tb and Tcd. Echoes 20, 21 and 22 in FIGS. 2*a*, 2*b* and 2*c*, respectively, can be automatically detected by alternating through the three specific focal laws described above to obtain Ta, Tb and Tcd using a typical phased array instrument. A single detection gate 24 as shown in FIGS. 2*a*, 2*b* and 2*c* that is placed appropriately to encompass the echo 20 to the end of the A-scan length which is long enough to make sure that very large wedges can be detected appropriately. It is a common practice that the maximum amplitude in the gate can be automatically determined and the time-of-flight to this echo can be measured. Detection gate 24 can be used in each focal law to measure Ta, Tb and Tcd.

Alternatively, signal processing methods may be employed to subtract the main bang echo from the A-scans for each focal law used for identifying the wedge. More specifically referring to FIG. 2*a*, as an example, signal processing methods can be used to separate echo 20 from main bang 23. As a result, the only signals that should be apparent on the A-scans would be the one echoed back from the wedge surface 6, which can result in more precision in TOF measurement of Ta, and likewise for Tb and Tcd. It can be appreciated by those skilled in the art that there are many ways to eliminate the main bang echo in A-scans. One method herein used in present disclosure is to pulse each focal law iteratively and capture the main bang echo without the presence of a wedge on the probe. Then the wedge can be placed back on the probe. The unit can then repulse the same focal laws and subtract the A-scan without the wedge from the A-scan with the wedge and thereby obtaining an A-scan with “no” main bang. This alternative embodiment is particularly useful for small wedges and lower frequency probes since echo 20 may be substantially at the same time-of-flight portion of main bang echo 23 in FIG. 2*a*. Without subtracting the main bang echo, it would make it more difficult to resolve echo 20.

It can be appreciated that many methods can be used to measure time-of-flight recorded by A-Scans. Besides the measurement described above, one can also capture the time from when the focal law is fired to when the leading edge of the echo waveform crosses a predetermined gate. It is a common knowledge to use certain measuring point of a waveform to capture time-of-flight, as long as the use of a given measuring point is consistent from one measurement of TOF to another.

With the parameters α, V and A determined by the presently disclosed method, any wedge with a flat contact surface can be automatically identified, using an otherwise typical phased array system with flat-bottom probe.

Figure 3A:
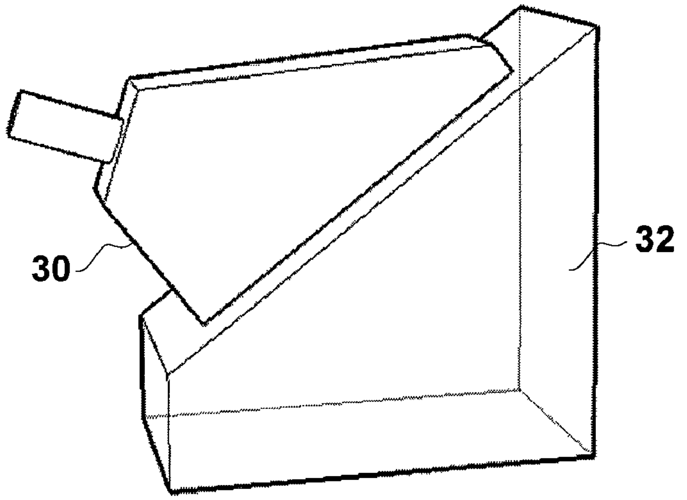
FIGS. 3*a* and 3*b* are diagrams showing a typical phased array probe on the same wedge in different positions: (a) normal, (b) reversed.
Figure 3B:
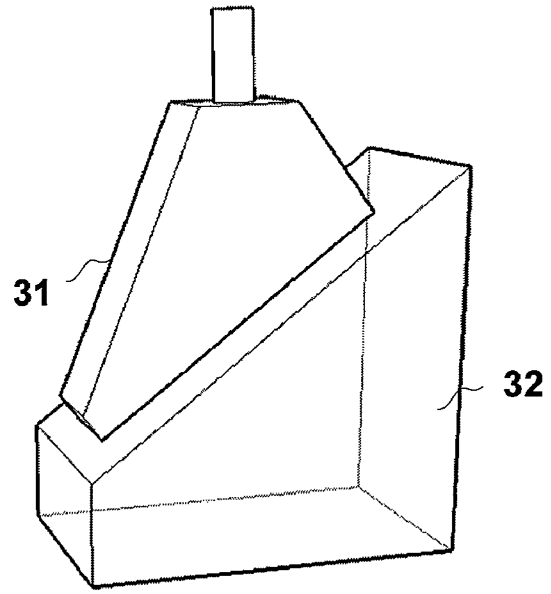
Figure 3C:
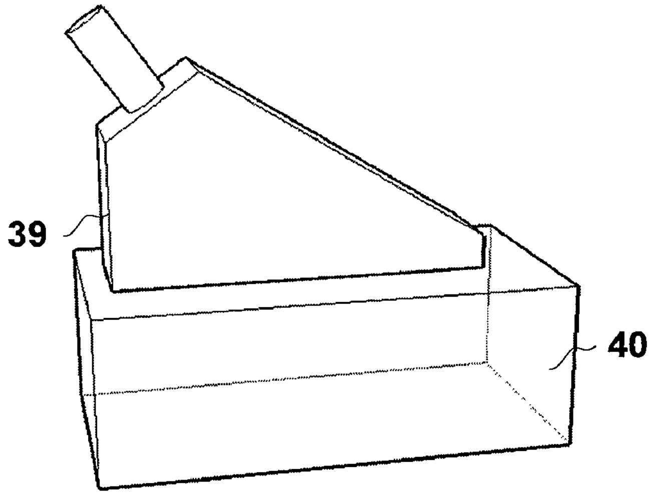
FIG. 3*c* is a diagram showing the same phased array probe as in FIG. 3*a* and 3*b* but on a 0° wedge.

Referring to FIGS. 3*a*, 3*b* and 3*c*, the aforementioned method applies to typical angle beam wedge 32 as well as 0°-delay-line-wedge 40. It can be appreciated by those skilled in the art that angle beam wedge 32 can be of any wedge angle potentially used in the NDT/NDI industry.

For some applications, phased array probes are not always placed in the same orientation on the same wedge. Referring to FIGS. 3*a* and 3*b*, the same phased array probe is positioned on the same wedge 32 but in two orientations. Probe position shown in FIG. 3*a* on wedge 32 is defined as the normal probe orientation whereas probe orientation shown in FIG. 3*b* on wedge 32 is defined as the reverse orientation.

In the preferred embodiment of the present disclosure, prior to providing α, V and A to the instrument, the automatic wedge detection method provides an option to enable comparison between Ta and Tb in order to determine the orientation of the probe. With the normal probe orientation, Tb is greater than Ta, whereas with the reverse orientation, the first element of the phased array probe will provide a longer time-of-flight to wedge surface 6 and therefore Ta is greater than Tb. The result of the comparison between Ta and Tb will affect equation Eq. 1 for α in such a way that if Ta is greater than Tb, equation Eq. 1 is replaced by equation Eq. 4 below. Equations Eq. 2 and Eq. 3 for V and A, respectively remain unchanged.

$$\alpha = \sin^{-1}\left(\frac{(Ta - Tb)}{2 * \sqrt{Tcd^2 - Ta * Tb}}\right) \quad \text{Eq. 4}$$

Another aspect of the present disclosure is used to eliminate wrong wedges. Steps can be included to remove any wedges with the angle (α), velocity (V) and first element height (A) provided by the auto wedge identification method that do not match those of listed potential wedges that can be used for a particular probe. After a wedge is identified using the presently disclosed method, steps can also be included to compare the calculated α, V and A with their default values of the particular wedge that are stored in a wedge database. If the instantly calculated parameters differentiate their default values to a large degree, it is an indication that the wedge has been worn and needs to be replaced.

Figure 4:
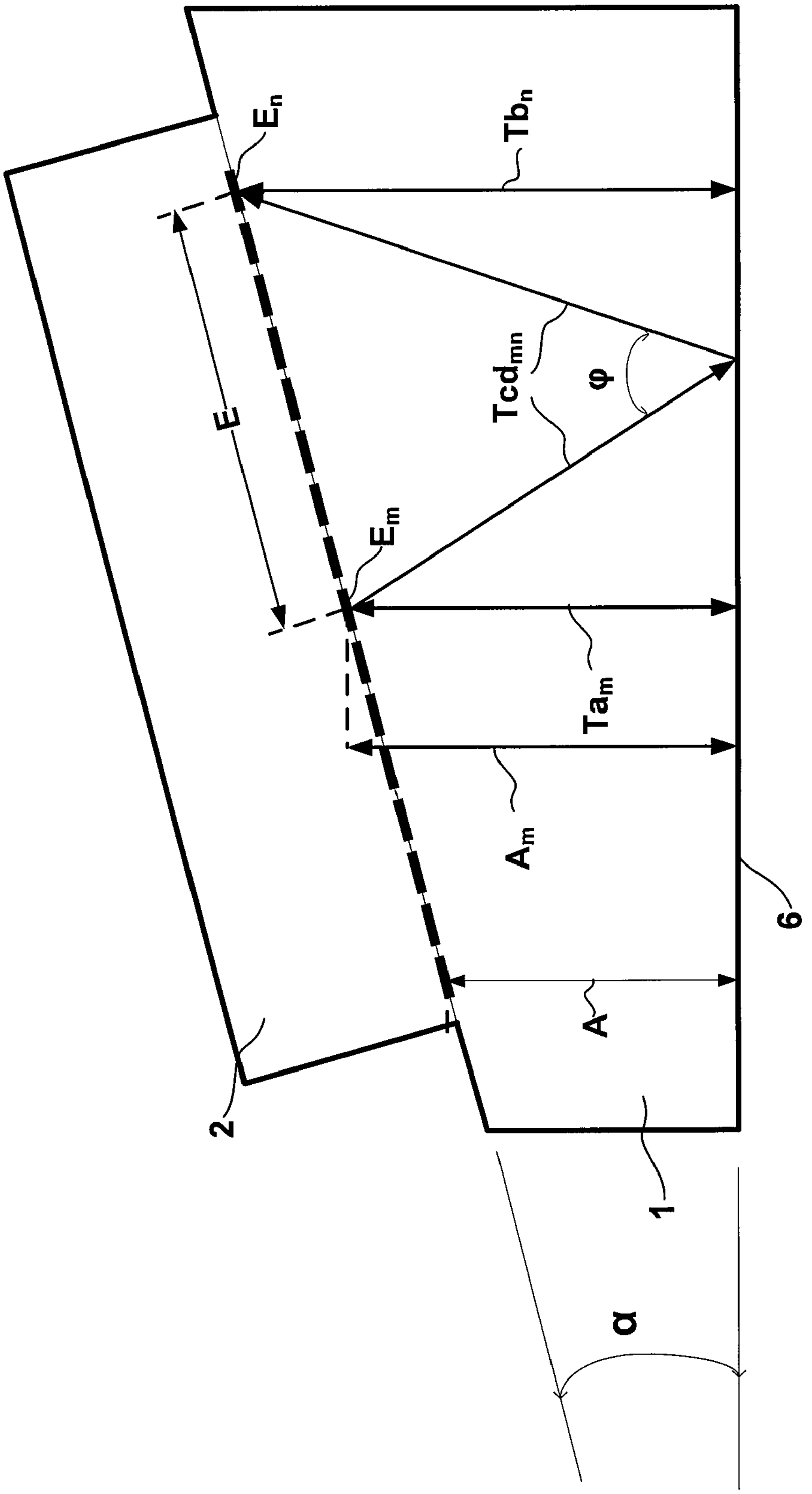
FIG. 4 is a cross-sectional view of a typical phased array probe and an angle beam wedge showing an alternative set of time-of-flight measurements used to calculate wedge parameters.

It can be deduced from the above disclosure of the invention that first element 4 and last element 8 in FIG. 1 does not have to be the only elements pairing for which the scope of the present invention can be applied. As shown in FIG. 4, in general any pairing of distant elements can be used to obtain equivalent time-of-flights $Ta_m$, $Tb_n$ and $Tcd_{mn}$. In FIG. 4., the same set of probe and wedge as in FIG. 1 is used, and the definition of all the physical and geometric characteristics are also the same as in FIG. 1, except that a different pair of elements are used for the TOF measurement. As shown in FIG. 4, $Ta_m$ is the time it takes for the front of a sound wave emitted from element Em to travel to and return from the opposite surface 6 of wedge 1. The ultrasonic phased array instrument similarly measures time $Tb_n$, which is the time it takes for the front of a sound wave emitted from element En to travel to and return from the opposite surface 6 of wedge 1.

Subsequently, the instrument sends a pulse from element Em and measures TOF $Tcd_{mn}$. $Tcd_{mn}$ refers to the time it takes for a sound wave emitted from element Em to travel to element En after reflecting from opposite surface 6 of wedge 1. The angle between the two segments of $Tcd_n$, is herein referred to as <ϕ.

Then the same set of equations Eq. 1~Eq. 3 can be used to calculate parameters for α, V and $A_m$ from the measured time-of-flight values $Ta_n$, $Tb_n$, $Tcd_n$. The height of the first element 4 of the probe A can be easily deduced from $A_m$.

Furthermore, even though the preferred embodiment teaches using a single element pair for measurement of TOF, it should be recognized that additional measurements can be obtained from other pair of elements. In an alternate embodiment, multiple element pairings can produce time-of-flight measurements of a plurality of equivalent Ta, Tb and Tcd sets. Each of these time-of-flight sets leads to calculations of α, V and A. Additional precision may be achieved by seeking the average values of parameters for α, V and A obtained from the measurements of a plurality pairs of elements. These parameter sets can also be compared to within given tolerances in order to validate the automatic detection of a given wedge and to avoid having an erroneous measurement negatively impact the final wedge parameters.

It should be appreciated by those skilled in the art that additional automatic wedge characterization means can be provided within the scope of the present disclosure. The validation of the wedge characterization can also be obtained using the scope of the invention as described above. For instance, when wedges are damaged in various manners or wedges do not have a substantially flat surface in contact with the material under inspection, in this preferred embodiment, it is designed to employ the steps using the scope of this invention to give indication whether the wedge is suitable to be characterized by the disclosed method, and/or whether the wedge identification is valid. The method of such validation on whether the wedge is suitable for identification is described below associated with FIGS. 5*a*, 5*b*, 6*a*, 6*b*, 7*a* and 7*b*.

Figure 5A:
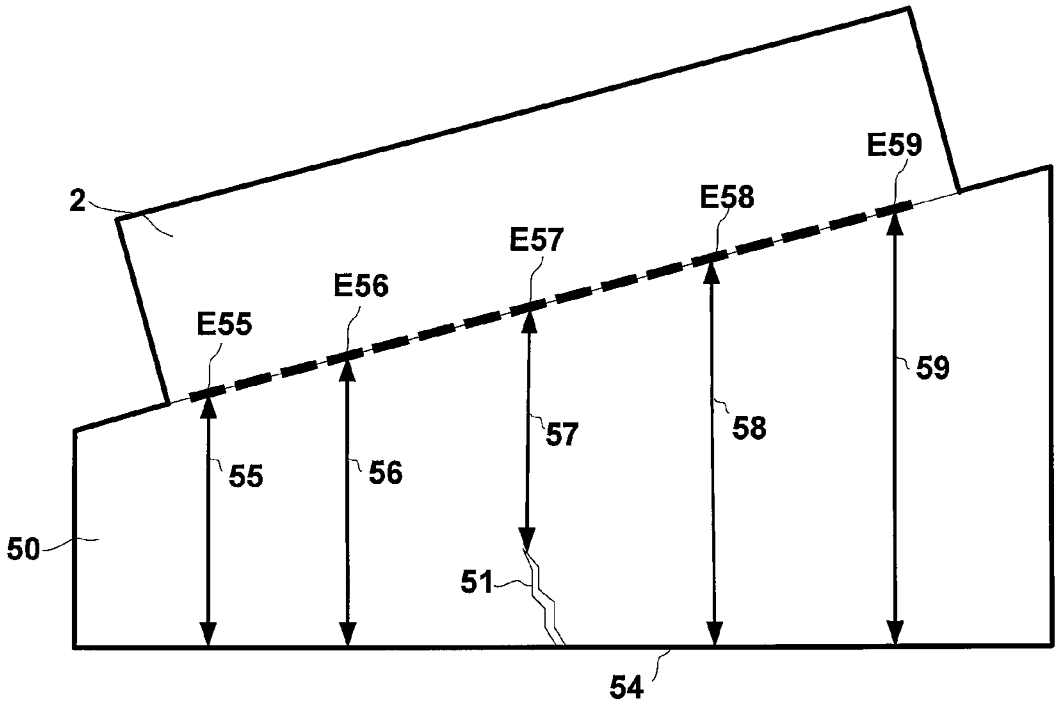
FIGS. 5*a* and 5*b* together show an example, in which lack of linearity among TOFs identifies a faulty wedge (crack) that is not suitable to be identified using the presently disclosed method.

Referring to FIG. 5*a*, wedge 50 has a substantial crack 51. The automatic wedge identification method described herein will potentially not function properly. In order to validate that a given wedge is adequate to be automatically detected, the preferred embodiment of the present invention provides an option for a validation step prior to calculating wedge parameters α, V and A. A plurality and up to maximum number of elements in a probe can be used and the time-of-flight from to each element to the wedge surface 54 can be compared. It can be assumed that there exists a substantially linear relationship between the time-of-flights of all elements of a phased array probe when said probe is attached to a flat-bottom and undamaged wedge such as those depicted in FIG. 1.

Figure 5B:
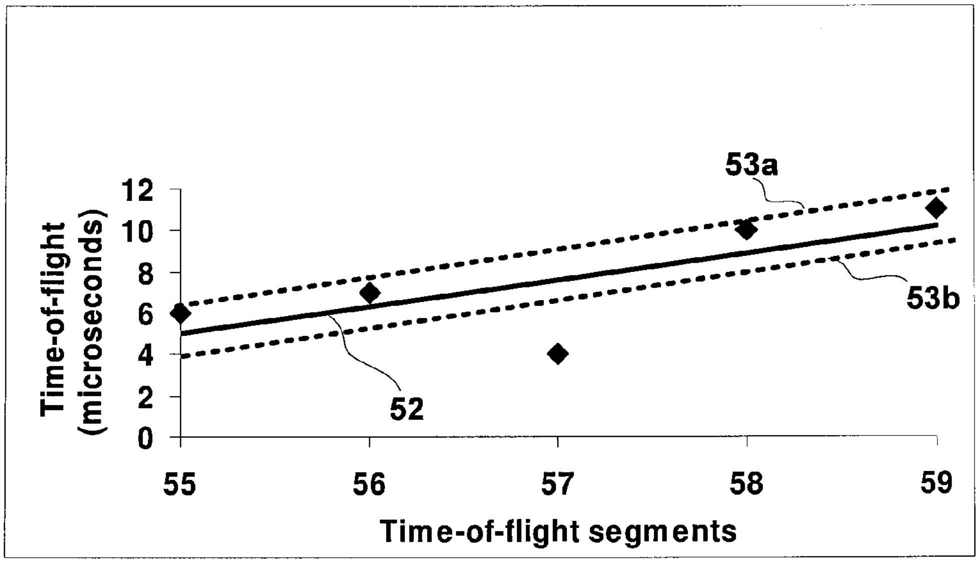

Referring to FIG. 5*a*, time-of-flights are measured for pulsed signals traveling from elements E55, E56, E57, E58 and E59 to the wedge surface 54 and traveling back to corresponding elements, shown as segments 55, 56, 57, 58 and 59, respectively. It must be recognized that this plurality of elements constitutes an example and the scope of this disclosure is not limited in this regards. In FIG. 5*a*, the values of time-of-flights for segments 55, 56, 57, 58 and 59 are measured and plotted in FIG. 5*b*. As can be seen in FIG. 5*b*, the substantial linearity between the time-of-flights of segments 55, 56, 58 and 59 is significantly disrupted by time-of-flight of segment 57 due to the presence of crack 51. As can be seen in FIG. 5*b*, solid line 52 represents linear trend between all five time-of-flights for each plot. Dotted lines 53*a* and 53*b* represent upper and lower thresholds of linearity respectively for each plot. If any TOF reading falls out of the threshold lines 53*a* and 53*b*, it is an indication that the wedge is not suitable to be identified or having substantial defects that need to be further examined.

Figure 6A:
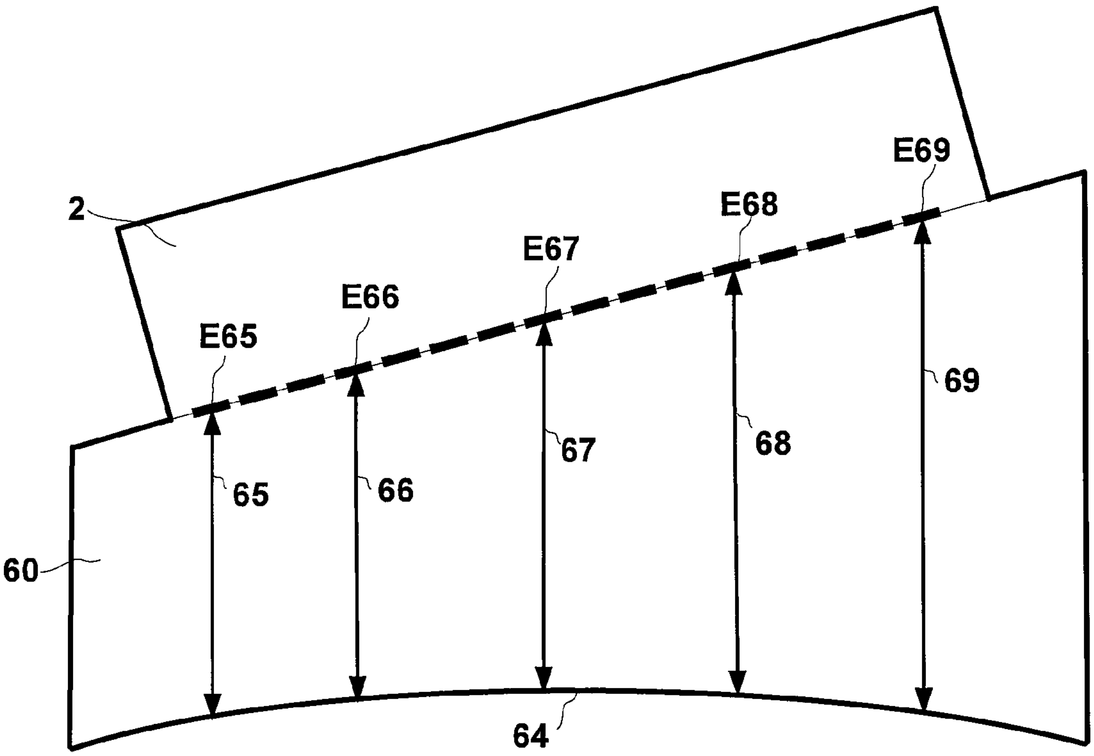
FIGS. 6*a* and 6*b* together show an example, in which lack of linearity among TOFs identifies a faulty wedge (curved bottom) that is not suitable to be identified using the presently disclosed method.
Figure 6B:
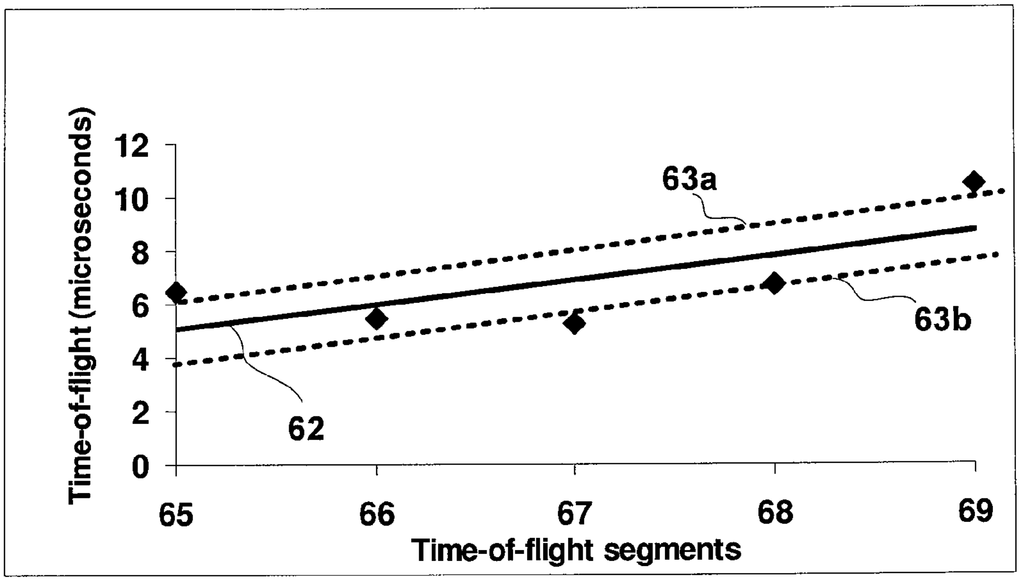

Referring to FIG. 6*a*, wedge 60 has a bottom surface 64 which is substantially curved. Time-of-flights are measured for pulsed signals traveling from elements E65, E66, E67, E68 and E69 to the wedge surface 64 and traveling back to corresponding elements, shown as segments 65, 66, 67, 68 and 69, respectively. Again, this should be recognized that this plurality of elements constitutes an example and the scope of this disclosure is not limited in this regards. In FIG. 6*a*, the value of time-of-flights for segments 65, 66, 67, 68 and 69 are measured and plotted in FIG. 6*b*. As can be seen in FIG. 6*b*, the trend of linearity among the time-of-flights of segments 65, 66, 67, 68 and 69 is significantly disrupted by time-of-flight of segments 65, 67 and 698 due to curvature on surface 64. Linear trend is shown by line 62 and the upper and lower thresholds of linearity are shown by 63*a* and 63*b* respectively. Any TOF readings that are out of the range within line 63*a* and 64*b* is an indication that the wedge is not suitable for identification and likely having defects need to be further examined.

Figure 7A:
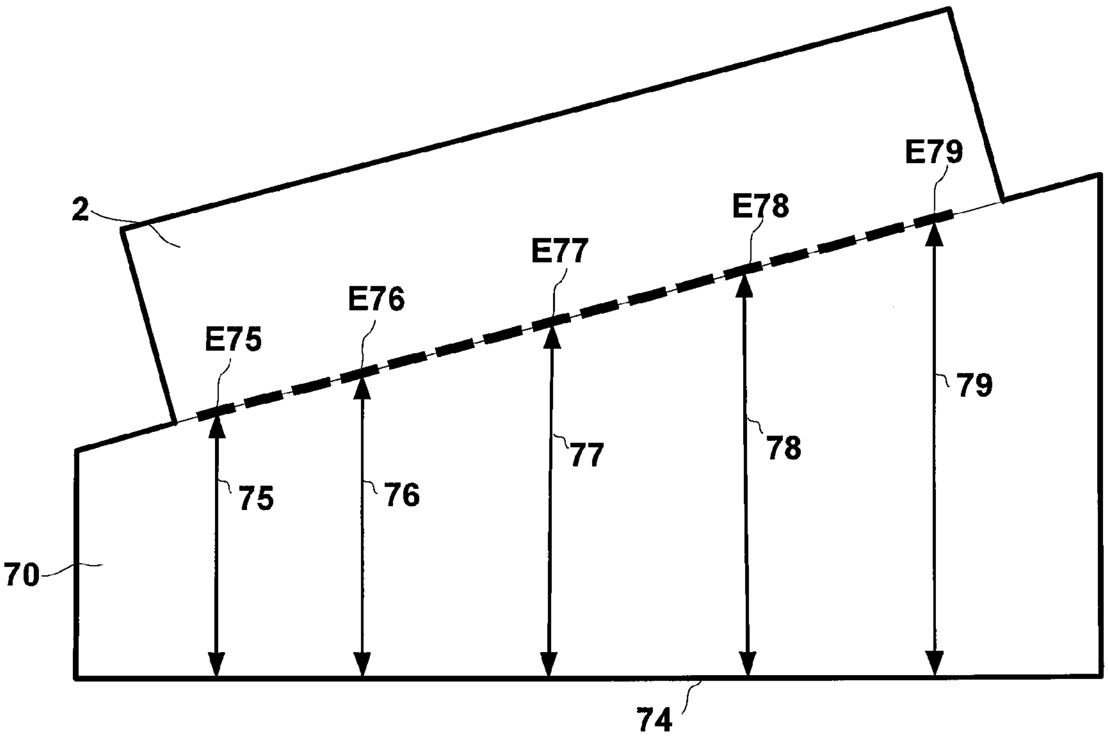
FIGS. 7*a* and 7*b* together show an example, in which linearity among TOFs confirms the wedge is suitable to be identified using the presently disclosed method.
Figure 7B:
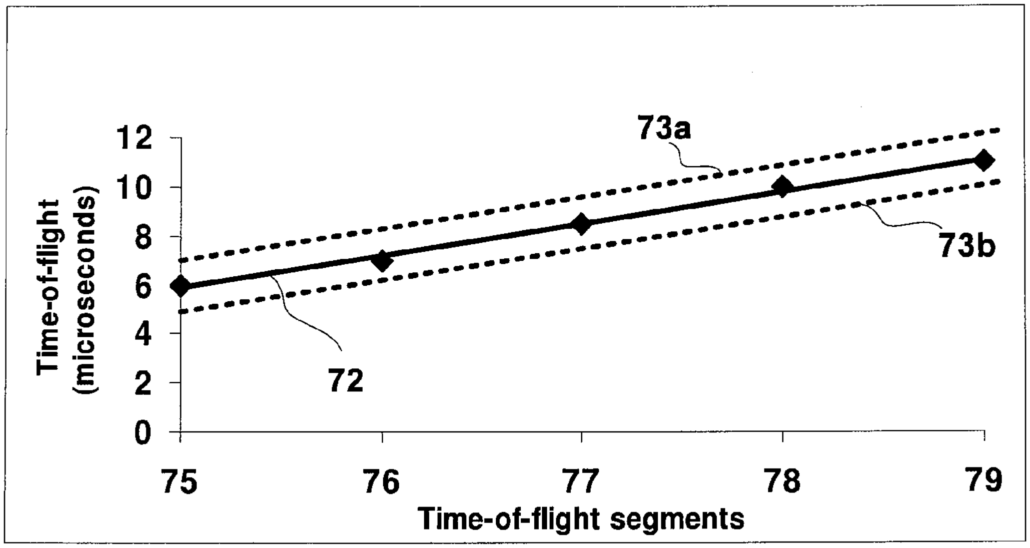

FIG. 7*a* shows a 'normal' wedge 70 that does not present any substantial defects, such as cracks or curved contact surfaces. The value of time-of-flights for segments 75, 76, 77, 78 and 79 are measured and plotted in FIG. 7*b*. As can be seen in FIG. 7*b*, the trend of linearity among the time-of-flights of segments 75, 76, 77, 78 and 79 can be clearly established. Linear trend is shown by line 72 and the upper and lower thresholds of linearity are shown by 73*a* and 73*b* respectively. As can been seen, when wedge 70 is substantially normal, all of the TOF readings are within line 73*a* and 73*b*. This validation process indicates that the wedge is suitable for identification using presently disclosed method.

Although the preferred embodiments of the above described method describe the identification of typical phased array wedges manufactured from solid materials such as acrylic and Rexolite to name a few, it should be appreciated that the scope of the invention can be applied to many other types of wedges, including but not limited to water wedges.

Figure 8:
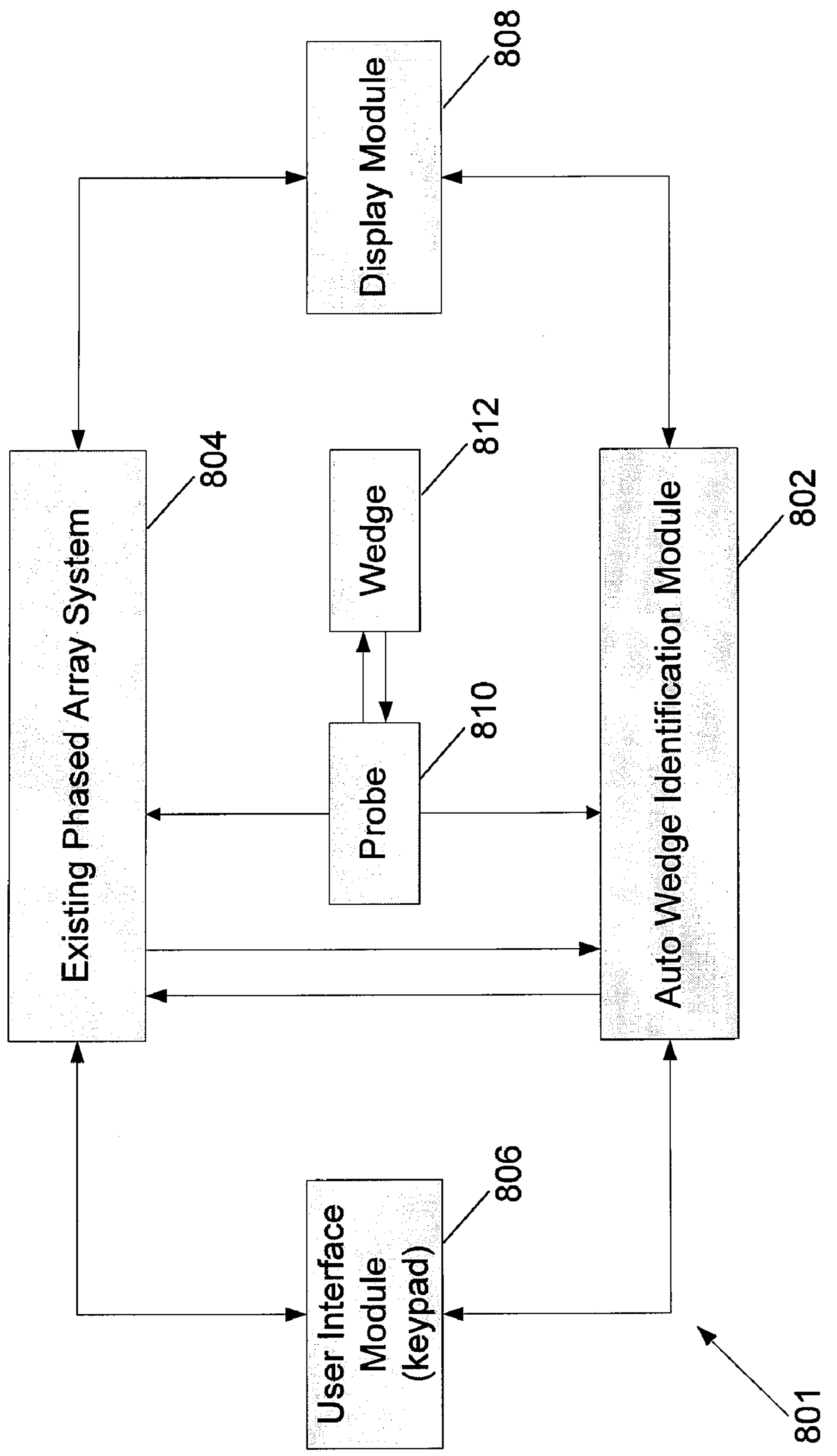
FIG. 8 is a diagram showing the best embodiment of Auto Wedge Identification System comprising the functional modules that the presently disclosed auto wedge identification method is implemented.

Another aspect of the present disclosure includes a system designed to enable operators in the field of phased array ultrasonic system to conduct wedge identification using the method as described above. The system herein is defined as an Auto Wedge Identification System. As shown in FIG. 8, the Auto Wedge Identification System 801 comprises a User Interface Module 806, an Auto Wedge Identification Module 802, an existing Phased Array System 804, a plurality of interchangeable phased array probes 810, a plurality of interchangeable wedges 812, and a Display Module 808.

The executable program of Auto Wedge Identification Module 802 in this preferred embodiment may reside in any one of the existing computing processors by modifying an existing phased array system as is deemed fit. It also can reside in any computing processor shared with other function modules of a phased array system. In addition, User Interface Module 806, probes 810, wedges 812 and Display Module 808 can share the same corresponding components that of the existing Phased Array System 804. Inherently, the interconnection means between Auto Wedge Identification Module 802 and other components such as User Interface Module 806, probes 810, and Display Module 808 can share those interconnection means between the existing Phased Array System 804 and the corresponding components, respectively.

The phased array probes 810 are of those probes typically used in existing phased array systems during typical phased array operations. No special phased array probes are needed for wedge identification purpose herein described. Each of the probes 810, one at a time, is connected simultaneously to Auto Wedge Identification Module 802 and the existing phased array system 804.

Alternatively, it can be appreciated by those skilled in the art that Auto Wedge Identification Module 802, User Interface Module 806, Display Module 808 and all the interconnections means as shown in FIG. 8 can also be built in a stand-alone instrument interacting with and providing wedge identification information to other existing phased array systems.

As further can be seen in FIG. 8, User Interface Module 806 is used for an operator to interact with the Auto Wedge Identification Module 802 and the existing Phased Array System 804. It can be an integral part of, or separately from the existing interfacing unit of the existing Phased Array System 804. It can also be built by customizing or modifying the user interface means of an existing phased array system. It could contain a button means to facilitate the above described interacting function. It can also be designed to be an integral part of the Display Module 808 with virtual buttons or any other display-interacting means to facilitate the above mentioned interacting functions. User Interface Module 806 and Display Module 808 together function to may carry out some of the following tasks of 1) prompting an operator if a wedge identification session is desired; 2) allowing the operator to instruct the start of a wedge identification session; 3) allowing a user to input and/or edit probe parameters, 4) allowing a user to input, edit and/or approve both known and calculated wedge parameters to be inputted to the Phased Array System 804, and 5) allowing users to select test options.

The Existing Phased Array System 804 is designed or modified so that it can directly interface with the Auto Wedge Identification Module 802 to read the detected wedge parameters. Alternatively, the detected wedge parameters can also be input to the Existing Phased Array System 804 manually via User Interface Module 806.

Figure 9:
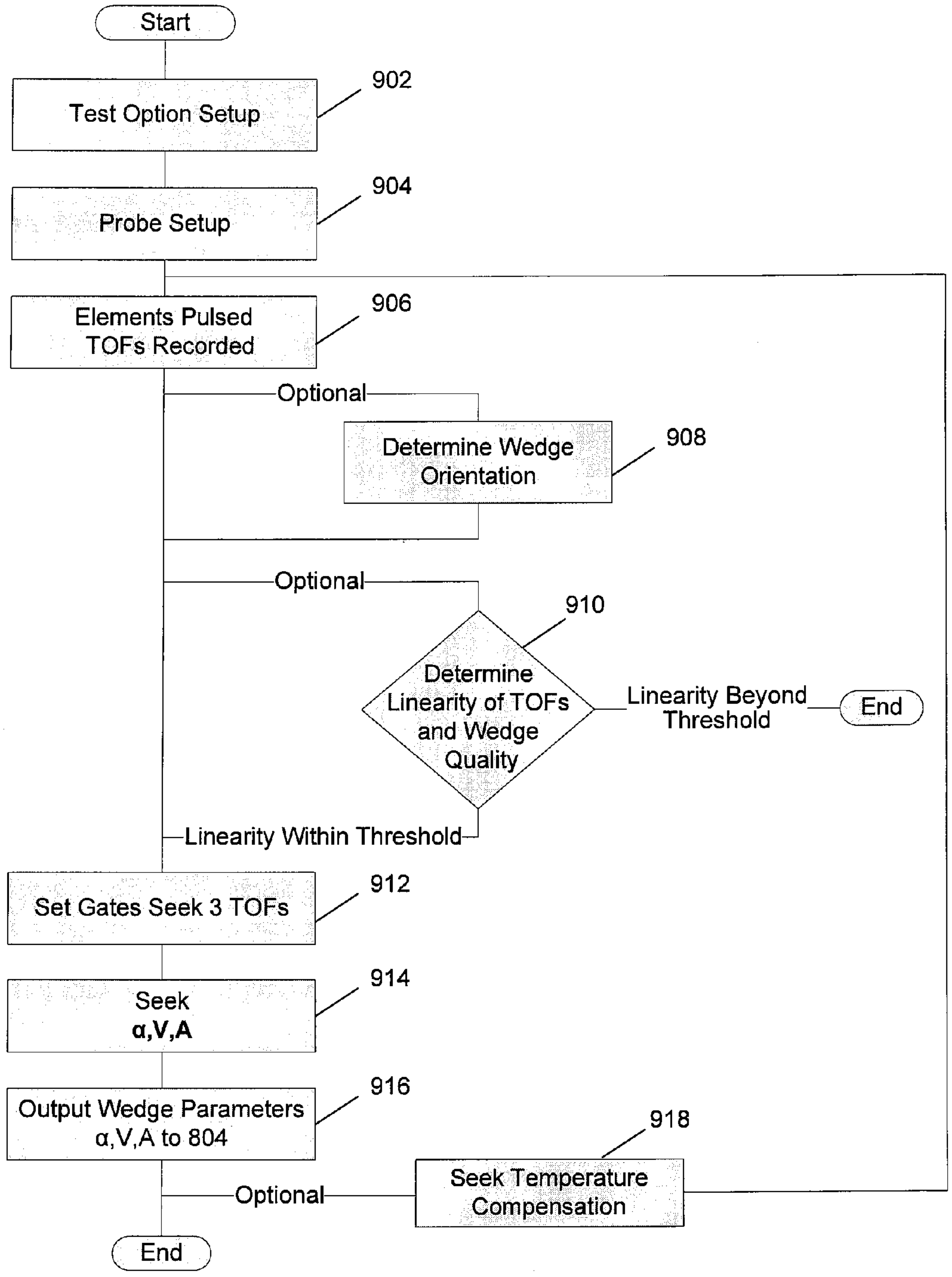
FIG. 9 is a diagram showing the functional blocks of the Auto Wedge Identification Module 802.

The functions of the computing program of Auto Wedge Identification Module 802 are described in FIG. 9.

It should be noted that herein described functions should be construed in accordance with the teaching and guideline described in the above Auto Wedge Identification Method.

At Block 902 in FIG. 9, test options are given as input to the Auto Wedge Identification Module 802 via User Interface Module 806, such as, whether to perform wedge orientation test, whether to perform wedge quality test to verify if the wedge is suitable to be identified by the Auto Wedge Identification System, and, whether to perform temperature compensation recalculation.

Probe Setup is performed at Block 904. This can be done in one of the following two ways. First, in most of the existing practice, after probe 810 is plugged in, the probe parameters are automatically recognized by the existing Phased Array System 804. The probe parameters are then communicated to the Auto Wedge Identification Module 802 from 804. The other way is to input the probe parameters manually via User Interface Module 806.

The probe parameters that are provided as input to the Auto Wedge Identification Module 802 include the following:

Total number of elements;

Distance between the first and last elements;

The elements that are designated to be used to acquire time of flights data. This input can be provided via the User Interface Module 806. At least two elements, preferably away from each other should be chosen. If at Block 902 the linearity or quality of the wedge is chosen to be checked, at least a certain number of, i.e., preferably at least five equally spaced elements should be chosen.

At Block 906, elements are pulsed according to configuration set at Testing Option Setup 902 and Probe Setup 904 blocks. Elements are pulsed accordingly, one at a time with the resulting A-Scans recorded by the Existing Phased Array System 804. The command to pulse one or sequentially a few elements is given via User Interface Module 806.

With the recorded A-Scans, the gates are set and corresponding TOFs are captured according to aforementioned teaching described in relation to FIGS. 1, 2 and 4.

At Block 908, optionally, if wedge orientation is chosen to be tested at Test Option Setup Block 902, then wedge orientation is given using measured data for TOFs according to aforementioned teaching described in relation to FIG. 3.

At Block 910, optionally, if the quality of the wedge and whether the wedge is suitable to be identified are chosen to be tested at Test Option Setup Block 902, using the measured values of TOFs, the linearity among TOFs is given according to aforementioned teaching in relation to FIGS. 5*a*, 5*b*, 6*a*, 6*b*, 7*a* and 7*b*. If the TOFs are within the linearity threshold, the wedge is suitable to be identified by the Auto Wedge Identification System. If the TOFs are beyond the linearity threshold, the defects in the wedge prevent it from being correctly identified by the Auto Wedge Identification System, and therefore the identification process ends.

Again in accordance with the teachings described in relation to FIGS. 1, 2 and 4 at Block 912, three designated TOF values Ta, Tb and Tcd are sought. At Block 914, the three TOFs are used to calculate the parameters $\alpha$, V and A using Eqs 1, 2, and 3. In case of inversed wedge tested at Block 908, Eq. 4 is used to calculate parameters $\alpha$, and Eqs 2 and 3 are used to calculate V and A, respectively.

At Block 916 the calculated wedge parameters $\alpha$, V and A are then provided the output to the Existing Phased Array System 804.

In situations such as when phased array operation is performed where a large degree of temperature change is expected, temperature compensation of the resulting wedge parameters should be chosen at the Test Option Setup Block 902. Then the program will initiate the functions of Block 918 to allow the system to re-gauge the wedge parameters changed due to temperature swings. The function of Block 918 is illustration in more detail in FIG. 10.

Figure 10:
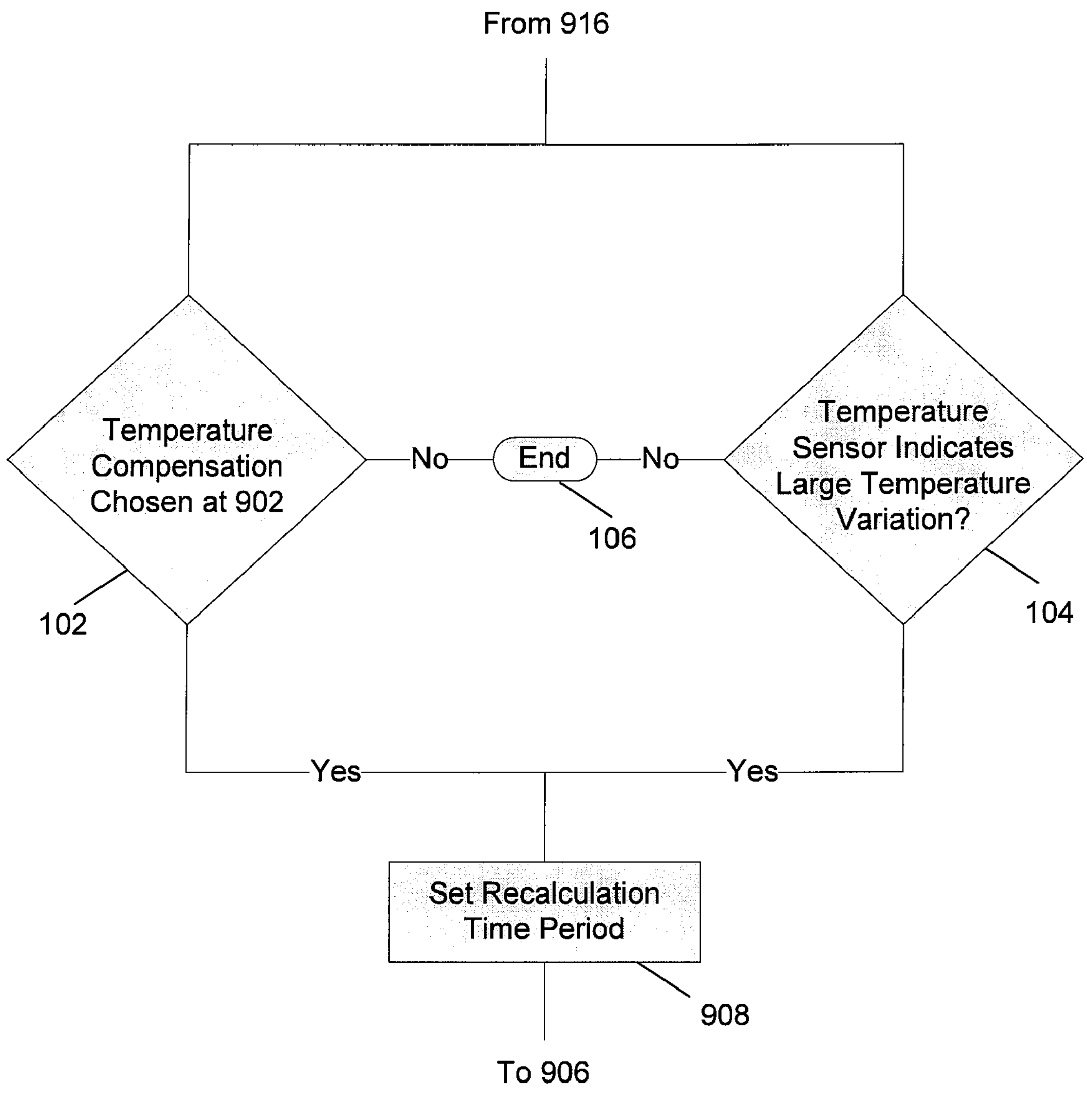
FIG. 10 is a diagram showing more detailed functional blocks of the Temperature Compensation function.

As shown in FIG. 10, upon completion of giving output of the wedge parameter at 916, the program either ends and finishes the wedge identification process, or optionally at 102 checks if "Temperature Compensation" has been chosen. If 'Yes', the program goes on to set re-calculation time period at 108. The re-calculation time period is determined according to specific application that yields different degree of temperature change and the speed of temperature change. The system automatically goes back to 906 through block 916 re-measure TOFs and recalculate wedge parameters. Alternatively, an alert can be sent out via Display Module 808 or other alerting means to prompt for operator to redo the wedge identification session. This is mostly the situation when removing the wedge from test target and cleaning the wedge are involved to prepare wedge parameters to be calculated.

In an alternative embodiment, the Auto Wedge Identification System can employ a temperature sensing-recording means as shown in 106, which is able either automatically or manually to indicate any major working temperature change at the wedge. When the wedge working temperature differs from what it was during the last session of wedge parameter identification to a predetermined degree, the system will start another session of auto wedge identification and recalculate wedge parameters $\alpha$, V and A.

In an alternative embodiment, the above functions can continue and run in a routine in the background of and concurrently with an otherwise conventional phased array ultrasonic detection system. It can be appreciated by those in the art that the computing program functions and routine described in FIG. 9 can be turned ON or OFF by the operator of the phased array system.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A method of automatically identifying probe wedges characterized by a plurality of parameters, including wedge angle, height of first element, and wedge acoustic velocity, said probe wedges being usable with an ultrasonic phased array system, the method comprising the steps of:

coupling a given probe wedge to the phased array system;

applying ultrasonic pulses from the phased array system to the given probe wedge;

measuring time of flight of the ultrasonic pulses through the given probe wedge;

calculating at least one of the parameters identifying the given probe wedge according to at least one the parameters to obtain at least one calculated parameter; and using the given probe wedge and the at least one calculated parameter to test objects.

2. The method of claim 1, in which the probe wedges have a flat surface and an inclined surface and the phased array system comprises a probe which is coupled to the inclined surface of the given probe wedge, wherein the probe includes a plurality of probe elements.

3. The method of claim 2, including applying the ultrasonic pulses from more than one of the probe elements and including receiving reflected ultrasonic pulses from the flat surface of the given probe wedge.

4. The method of claim 3, wherein the probe elements include a first probe element and a second probe element.

5. The method of claim 4, including applying a first ultrasonic pulse from the first probe element and receiving a reflection of the first ultrasonic pulse at the first element, and applying a second ultrasonic pulse from the second probe element and receiving a reflection of the second ultrasonic pulse at the second element.

6. The method of claim 5, including repeating the application of the first ultrasonic pulse and the second ultrasonic pulse for at least one more time.

7. The method of claim 2, wherein the height of the first element parameter is the distance between a center of the first probe element of the probe from the inclined surface to the flat surface along a direction which meets the flat surface at a right angle.

8. The method of claim 2, including determining probe orientation.

9. The method of claim 2, including testing probe wedges and identifying wedges for removal when one or more of the parameters of the tested wedges is outside a predetermined acceptable range.

10. The method of claim 2, including calculating a plurality of wedge angles, a plurality of acoustic velocities, and averaging their values to obtain an average value of the wedge angle and the acoustic velocity, relative to the given probe wedge.

11. The method of claim 2, including obtaining a sufficient number of time of flight segments to determine whether any defects exist in the given probe wedge, by determining whether any time of flight reading falls outside of a threshold value for the probe wedge.

12. The method of claim 2, including inputting into a database probe wedge parameters for the probe wedges, said parameters including: the total numbers of elements in a probe, the distance between the first and last elements, the type of material of which the wedge is fabricated, the distances between the elements and the flat surface of the wedge, and the wedge angle.

13. The method of claim 2, including providing a temperature compensation database and compensating measurement results obtained by reference to temperature compensation data.

14. The method of claim 3, including obtaining a plurality of height measurements to confirm that the flat surface of the wedge is maintained across the entire surface thereof.

15. The method of claim 3, further including repeating the aforementioned steps of applying, receiving and measuring for a plurality times, choosing a different set of probe elements at a time.

16. The method of claim 4, including applying another ultrasonic pulse from one of the probe elements and receiving a reflection of that ultrasonic pulse at another probe element which is spaced away from the first element.

17. The method of claim 4, including a database storing the parameters of different types of probe wedges, the parameters stored in a database including the wedge angle parameter and the acoustic velocity parameter, and including the step of identifying the given probe wedge by firstly obtaining the wedge angle parameter, and on the basis the wedge angle parameter selecting from the database the other parameters of the given probe wedge.

18. The method of claim 4, including determining time of flight of acoustical pulses with more than a single pair of the elements.

19. The method of claim 4, including measuring probe height by the distance between the center of the first probe element and the flat surface of the probe wedge along a direction which meets the flat surface at a right angle.

20. The method of claim 1, including utilizing the phased array system to test an object for defects by launching ultrasonic pulses into the object through the given probe wedge and further including carrying out the identifying steps of claim prior to the carrying out the testing of the object.

21. The method of claim 1, including calculating the wedge angle α using the equation $$\alpha = \sin^{-1}\left(\frac{(Tb - Ta)}{2 * \sqrt{Tcd^2 - Ta * Tb}}\right),$$

wherein Ta is the time it takes for an ultrasonic pulse emitted from element a, traveling to and reflected from the flat surface and returning back to element a, Tb is the time it takes for an ultrasonic pulse emitted from element b, traveling to and reflected from the flat surface and returning back to element b, Tcd is the time it takes for an ultrasonic pulse emitted from element a, traveling to and reflected from the flat surface and returning back to element b.

22. The method of claim 1, including calculating the wedge acoustic velocity V using the equation $$V = \frac{E}{\sqrt{Tcd^2 - Ta * Tb}},$$

wherein Ta is the time it takes for an ultrasonic pulse emitted from element a, traveling to and reflected from the flat surface and returning back to element a, Tb is the time it takes for an ultrasonic pulse emitted from element b, traveling to and reflected from the flat surface and returning back to element b, Tcd is the time it takes for an ultrasonic pulse emitted from element a, traveling to and reflected from the flat surface and returning back to element b.

23. The method of claim 1, including calculating the height parameter A using the equation $$A = \frac{Ta * E}{2 * \sqrt{Tcd^2 - Ta * Tb}},$$

wherein Ta is the time it takes for an ultrasonic pulse emitted from element a, traveling to and reflected from the flat surface and returning back to element a, Tb is the time it takes for an ultrasonic pulse emitted from element b, traveling to and reflected from the flat surface and returning back to element b, Tcd is the time it takes for an ultrasonic pulse emitted from element a, traveling to and reflected from the flat surface and returning back to element b' and further, wherein E comprises the distance between the probe elements a and b.

24. The method of claim 1, wherein the probe wedges are tested for compliance of their wedge angle, velocity, and the height of the first element within predefined ranges.

25. A method of identifying probe wedges characterized by a plurality of parameters, including wedge angle, height of first element, and wedge acoustic velocity, said probe wedges being usable with an ultrasonic phased array system, the method comprising the steps of:

coupling a given probe wedge to the phased array system;

applying ultrasonic pulses from the phased array system to the given probe wedge;

measuring time of flight of the ultrasonic pulses through the given probe wedge;

calculating at least one of the parameters to identify the given probe wedge; and pulsing the phased array system iteratively to capture a main bang echo without the presence of a wedge, and thereafter, proceeding with the aforementioned steps of: coupling, applying, measuring and identifying, and subsequently subtracting an A-scan without the wedge from an A-scan result with the wedge.

26. An ultrasonic phased array system, including:

a probe, including at least a first probe element and a last probe element, a probe wedge coupled to the probe elements;

a phased array device for applying ultrasonic pulses from the probe elements to the probe wedge, wherein the phased array device is configured for measuring time of flight of the ultrasonic pulses through the probe wedge; and a wedge identification module for calculating at least one of a plurality of parameters associated with the probe wedge, wherein said parameters include a wedge angle, a height of first element and a wedge acoustic velocity, wherein the wedge identification module is executed by a digital processor electronically connected with the phased array device.

27. The system of claim 26, including a user interface facility for activating the system to activate the calculating facility prior to the utilization of the ultrasonic system to test an object for defects.

28. A computer program embodied in a tangible medium and executed by at least one digital processor of a phased array system configured to execute the following process:

applying an ultrasonic pulse from a probe element of the phased array system to a given probe wedge;

causing the ultrasonic pulse travel within the given probe wedge with a predetermined path;

receiving the ultrasonic pulse at a probe element of the phased arrays system;

measuring time of flight of the ultrasonic pulses;

repeat the above steps if necessary; and calculating a plurality of parameters, including a wedge angle, height of first element, and wedge acoustic velocity of the given probe wedge;

and identifying the probe wedge characterized by the calculated parameters.

* * * * *